Nov. 20, 1962    M. H. STARK    3,064,544
STAGGERED PLY TUBE BODY
Filed June 27, 1961    2 Sheets-Sheet 1
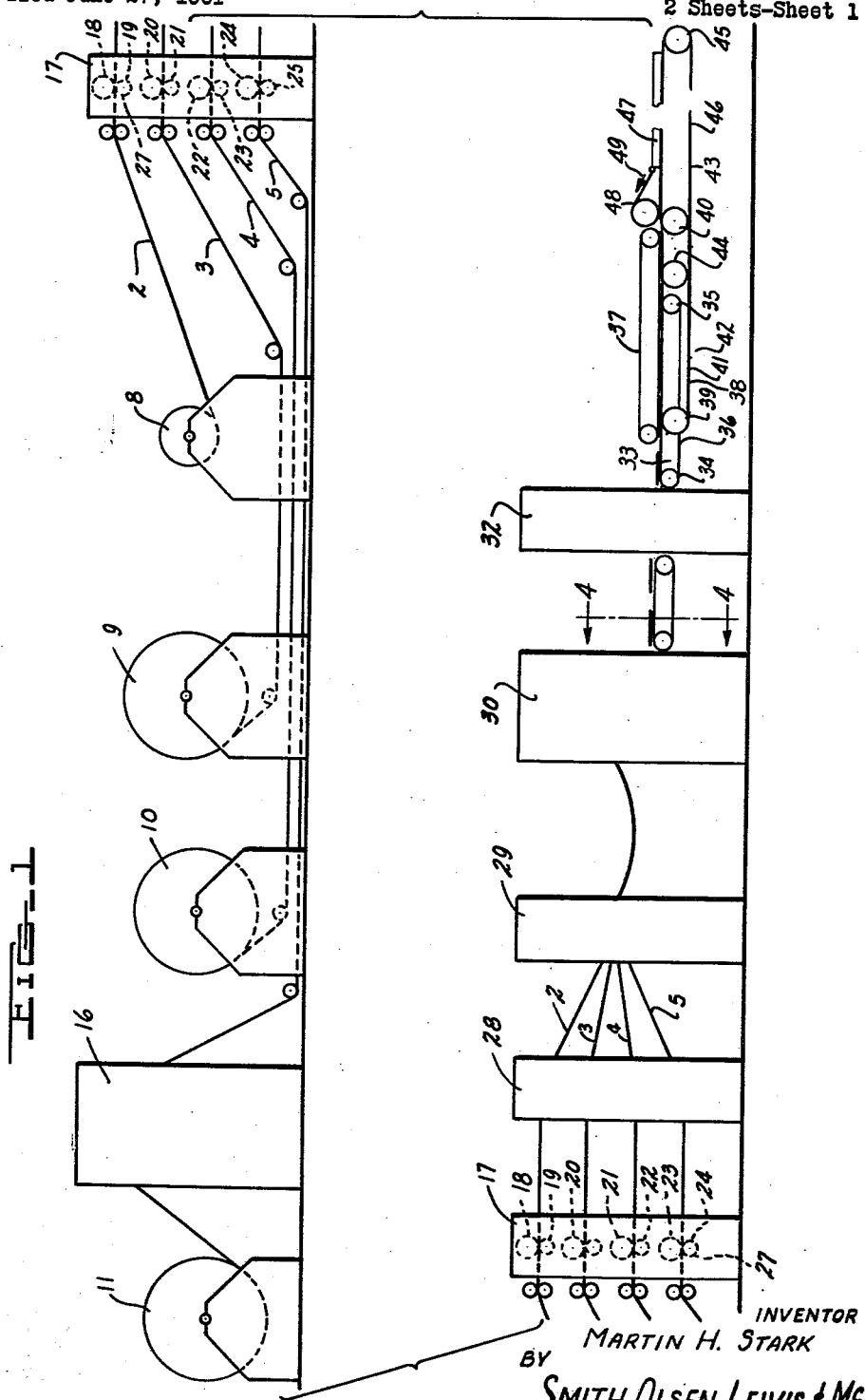
INVENTOR
MARTIN H. STARK
BY
SMITH, OLSEN, LEWIS & McRAE
ATTORNEYS

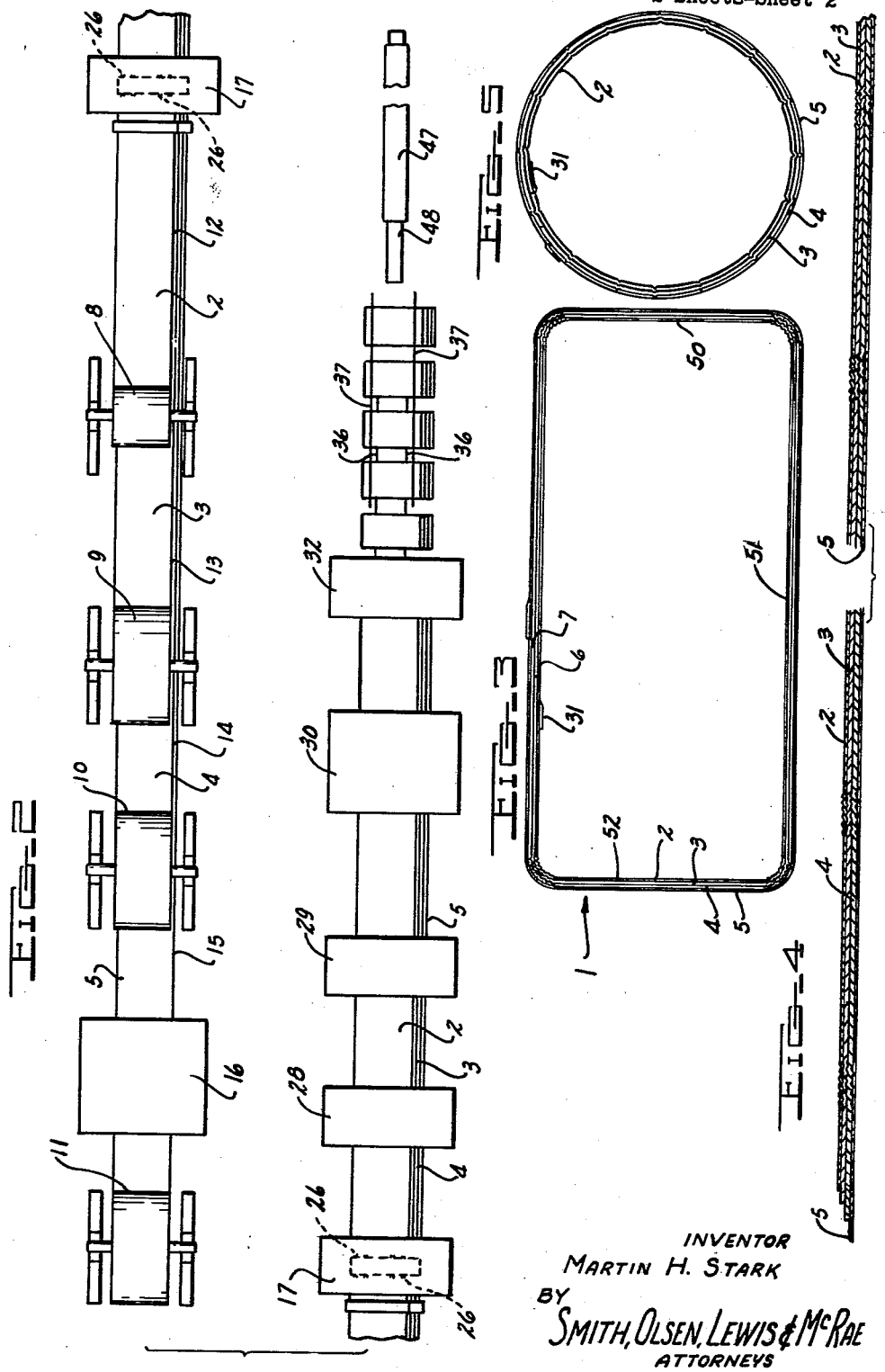

United States Patent Office 3,064,544
Patented Nov. 20, 1962

3,064,544
STAGGERED PLY TUBE BODY
Martin H. Stark, 223 N. Porter, Saginaw, Mich.
Filed June 27, 1961, Ser. No. 133,006
9 Claims. (Cl. 93—94)

This invention relates to tube bodies of the type which are employed in pasteboard containers, composite metal-pasteboard containers, containers lined with saran or other fluid impervious material, fiber drums, and other similar containers.

Objects of the invention are to provide tube bodies, and method of forming said bodies, wherein:

(1) Desired lining materials may be easily incorporated into the tube body during the tube body-forming operation, (2) The lining materials (including barrier materials between plies) may, if desired, occupy any number of plies without being required to be wound up around all of tube body plies, as per the present convolute method; thereby enabling placement of the lining materials in only the most advantageous positions so as to utilize a minimum amount of lining material for a given "lining" function, (3) The single inside lining ply (of metal foil or plastic material for example) can be incorporated in such a way as to fully seal off the exposed or so called "raw" edge of the next ply of material; thereby preventing a "wicking" action of the ply material.

(4) The tube body may be formed by a method wherein the high production advantages of the conventional "spiral" method are combined with the "tube body strength" advantages of the conventional "convolute" method, (5) The formed tube body may be made up of multiple numbers of plies, without seriously impeding tube body output, (6) The points of adjacent plies may be staggered to provide a tube body of maximum strength, (7) The tube body may be formed of various different cross sections, including round or rectangular; it being noted that the conventional "spiral" method can only be used to form round cross-sectioned tubes.

(8) The tube body-forming materials may be formed into the tube body without danger of crumpling, wrinkling, tearing, splitting, or otherwise breaking apart during the tube body-forming operation, (9) The tube body may be provided with a label sheet as the tube body is being formed, and the label sheet may be printed as it is being introduced onto the tube body, thereby lowering production costs and handling costs incident to the labelling operation.

Other objects of this invention will appear in the following description and appended claims, reference being had to the accompanying drawings forming a part of this specification wherein like reference characters designate corresponding parts in the several views.

On the drawings:

FIGURE 1 is a schematic elevational view of one apparatus which can be utilized to form the tube body of the present invention;

FIGURE 2 is a schematic plan view of the FIGURE 1 apparatus;

FIGURE 3 is a cross sectional view of a tube body constructed according to the present invention;

FIG. 4 is an enlarged sectional view on line 4—4 in FIGURE 1 and showing the tube body-forming materials prior to their being bent into the FIGURE 3 configuration;

FIGURE 5 is a cross sectional view in the same direction as FIGURE 3 but of a "round" tube body.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a hollow tube body 1 formed of a plurality of separate superimposed ply-forming sheets 2, 3, 4 and 5, each having their lateral edges positioned together to form one ply of the tube body. If desired the edges of each ply may overlap each other for increased strength and be skived or beveled to provide a "non-bumpy" joint. Innermost sheet 2 (which may be considered as constituting a liner) is preferably formed of metal foil, polyvinylidene chloride, polyethylene, rubber hydrochloride film, or other material impervious to the passage of fluids. Sheets 3 and 4 are preferably formed of a low cost material such as pasteboard or cardboard. Sheet 5 is preferably constructed of paper, and is preferably printed with suitable advertising indicia, whereby to constitute a "label" sheet. Suitable adhesives are applied on the faces of sheets 2 through 5 whereby to hold the sheets in their FIGURE 3 "tube-body-forming" positions. It will be noted that the joints 6 and 7 which the ends of sheets 4 and 5 make with each other are staggered laterally (i.e. in directions at right angles to the tube body axis). This lateral staggering of joints 6 and 7 greatly increases the strength of the tube body.

Tube body 1 is preferably formed by the apparatus schematically illustrated in FIGURES 1 and 2. Said apparatus includes a plurality of rolls 8 through 11 for supplying the various sheet materials 2 through 5. It will be noted that the edges 12 through 15 of sheets 2 through 5 are offset with respect to one another by suitable axial offsetting of supply rolls 8 through 11, the purpose of this arrangement being to achieve the aforementioned "staggering" of the "ply joints."

As label sheet 5 is unwound from supply roll 11 it passes through a conventional printing mechanism 16. Each of sheets 2 through 5 passes through a creasing mechanism 17.

Mechanism 17 preferably includes a series of rollers 18 through 25, each two adjacent rollers being adapted to form creases in one of the sheets 2, 3, 4 or 5. Rollers 18, 20, 22 and 24 are each provided with a series of peripheral ribs 26; and rollers 19, 21, 23 and 25 are each provided with a series of mating peripheral grooves 27. These ribs and grooves cause creases to be formed in the sheets as they are fed between rollers 18 through 25. The ribs and grooves are so spaced from each other along the axes of the rollers that the creases are formed in those portions of the sheets which will subsequently form the corners of the tube body. The purpose of the creases is to facilitate bending of the sheets and to compensate for the increased peripheral distances which the outermost sheets must travel as they are being formed into the FIGURE 3 configuration, as will be more apparent later in the description.

After leaving crease mechanism 17 each of sheets 2 through 5 passes through a conventional adhesive applicator mechanism 28, and thereafter through "combining" mechanism 29. Mechanism 29 consists merely of two rollers (not shown) which press the various sheets together to effect an initial adherence of the sheets through the intermediary of the previously applied adhesive.

From "combining" mechanism 29 the adhered-together sheets pass through a cut-off mechanism 30, the function of which is to cut the adhered sheets to the desired tube body length. Mechanism 30 may be a conventional rotary cutter, traveling cutter, or platen cutter.

The cut-to-length sheets are fed eventually into a tube body-forming mechanism; but in those cases where special materials, such as metal foil, are employed for liner sheet 2 it is desirable that a special adhesive be applied on the edge portion 31 of the liner sheet which overlaps the other edge portion of said sheet (see FIGURE 3). This requirement is necessitated by the fact that adhesive suitable for use between two pasteboard surfaces or between a pasteboard surface and a metal or plastic surface are not suitable for use between two plastic or two metal surfaces, either because of adhesive cost differences or "bond strength" deficiencies. In order that overlapping portion 31 may have its own adhesive the sheets are fed from mechanism 30 into an "edge gluing" mechanism 32, the purpose of which is to apply a film of adhesive along the upper surface of edge portion 31. Mechanism 32 preferably includes an adhesive-applying roller having an axial dimension corresponding to the width of edge portion 31.

After leaving mechanism 32 the sheets are movably supported on endless belt conveyor 33, which is defined by pulleys 34 and 35 and belts 36.

Thereafter the sheets are introduced between endless movable belts 37 and chain conveyor 38. Chain conveyor 38 is defined by sprockets 39 and 40, and endless chains 41. Chain conveyor 38 is intended to act as a device for insuring that the adjacent sheet lengths are spaced apart from one another; and to that end chains 41 are provided with lugs 42. Chains 41 are moved at a linear speed slightly in excess of that of belts 36. As a result lugs 42 are caused to contact the "upstream" or "rear" edge of each sheet length so as to space the sheet lengths apart from one another.

While the sheet lengths are still under the influence of conveyor 38 they are fed onto a movable conveyor 43 which is defined by pulleys 44 and 45 and belt 46. Belt 46 runs beneath a fixed mandrel 47 of the type disclosed in Patent No. 2,933,988, dated April 26, 1960. Another belt 48 runs through mandrel 47 in the same manner as belt 31 in the aforesaid Patent No. 2,933,988 dated April 26, 1960. Suitable deflecting mechanisms (not shown) are provided for causing the sheet lengths to be wrapped around the mandrel as they travel therealong under the influence of belts 46 and 48. The direction of travel of belt 48 is indicated by arrow 49. The operation of the mandrel, belts 46, 48 and the deflecting mechanisms is set forth in detail in the aforesaid Patent No. 2,933,988.

Accordingly, a detailed description of the operation is not included in the present application.

It will be appreciated that as the sheet lengths are wrapped around mandrel 47 the outermost plies must shift or "travel" in a peripheral direction relative to the innermost plies in order to compensate for the thickness of the innermost plies; it being understood that the "effective" peripheral surface of the mandrel, insofar as the outermost plies are concerned, is that provided by the innermost plies (which is of course greater than that of the mandrel proper). This peripheral shifting of the sheets is undesirable in that the initial "set" of the adhesive bonds between adjacent plies is upset; even though the bonds are subsequently reset after the tube body assumes its FIGURE 3 configuration, the bonds never fully regain the strength which they "potentially" possessed prior to their being upset (i.e. which they would have had after complete curing if no bond breakage had taken place).

One function of the aforementioned creases in the sheets is to localize as much as possible the extent of bond upsetting during the tube body-forming operation. Thus, as the sheets undergo the "wrapping" action around mandrel 47 the creases provide an excess of sheet material, whereby the amount of "sheet shifting" along each face of the mandrel is at a minimum, both as respects the distance each sheet shifts and the area of sheet subject to shifting. In this regard, the areas of sheet material 50, 51 and 52 along the central portions of each mandrel face do not undergo any shifting; substantially all of the shifting takes place adjacent the creased portions. Without the creases almost the entire extent of the outermost sheets would undergo a shifting action; with a resultant increase in the extent of bond breakage. Because the outermost sheets undergo a greater "peripheral shift" than the innermost sheets the amount of crease-forming material in the outermost sheets is preferably greater than in the innermost sheets, however this relation may be reversed. The amount of crease-forming material may be varied by varying the amplitude of the creases and/or the number of creases. In some cases the creases may be omitted in certain of the sheets. In the interest of giving a comparatively smooth eye-pleasing appearance to the tube body the amplitude of the creases is preferably maintained as small as possible, with the total number of creases being varied accordingly. During the tube body-forming operation the creases in the outermost sheet are to a great extent "ironed out" by the aforementioned "sheet shifting" action, and the finished tube body presents a substantially smooth surface at the tube body corners.

In practice the creases in the tube body sheets also serve to prevent a "folding over" or "crumpling" of the liner sheet, particularly along the narrowest planar faces of the tube body. Without the creases (and particularly when the metal foil is employed as the liner material) an objectionable irregular folding action takes place in the liner sheet.

The tube body is illustrated in FIGURE 3 as being rectangular in cross section, but it is contemplated that "round," "oblong" or other cross sectioned tube bodies could also be formed. In the case of a round tube body there may be provided a number of creases in one or more of the tube body sheets, with the creases being spaced evenly around the tube body periphery. The "staggered joint" construction obtained by offsetting of the sheet material supply rolls may also be realized in round or oblong tube bodies.

The described method of forming the tube bodies results in relatively higher tube body output speeds than either of the conventional "spiral" method or the conventional "convolute" method. Additionally the "tube body strength" characteristics of the "convolute" method are attained. In the conventional spiral method the tube plies are introduced onto a fixed mandrel at an angle to the mandrel axis so as to "spiral" around the mandrel during the tube-forming operation. Tubes formed by the spiral method do not possess relatively high strength characteristics. In the conventional "convolute" method each tube-component sheet is mechanically wrapped around a rotating mandrel, and subsequently stripped therefrom. The convolute method is not adapted for economical incorporation of lining materials during the tube-forming operation (due to the fact that the linings—which are sometimes costly materials—would necessarily be wound up between successive tube plies, thereby necessitating an inordinately large amount of lining material). In the present method the lining materials are incorporated with the other materials into a one-piece sheet before being cut to length; thereby permitting the use of a minimum amount of fluid impervious (but comparatively high cost) lining materials of relatively thin easily flexed material. These materials are prone to collapse unless otherwise supported, but because they are introduced onto the other sheets while still in the form of a continuous web the danger of their collapsing is eliminated, and their incorporation into the tube body is greatly facilitated.

This application is a continuation-in-part of my earlier filed application, Serial No. 586,525, filed May 22, 1956, now abandoned.

Having thus described my invention, I claim:

1. In a method of making a multi-sided laminated tube of non-circular cross-section including the steps of assembling a plurality of individual fibrous webs and a non-fibrous liner web into a composite multi-thickness sheet, transversely severing the sheet and wrapping the same about a transverse axis into a polygonal tubular configuration having an internal liner, the improvements of transversely and individually creasing the webs prior to their adhesive assembly and at locations corresponding to the juncture of adjacent tube sides, the extent of creasing of the webs increasing with increasing distance from the liner in the final article and being sufficient to accumulate additional material in the webs when laminated to accommodate subsequent wrapping of the multi-thickness sheet about said axis, said liner web being creased to an extent substantially less than the extent of creasing of any of the fibrous webs.

2. In a method of making a multi-ply laminated tube of non-circular cross section including the steps of assembling a plurality of individual fibrous webs into a composite multi-thickness sheet, transversely severing the sheet and wrapping the same about a transverse axis into a polygonal tubular configuration, the improvements of transversely creasing the individual fibrous webs to different extents prior to their adhesive assembly and at locations corresponding to the juncture of adjacent tube sides to accumulate additional material in the webs when laminated to accommodate subsequent wrapping of the multi-thickness sheet about said axis, the extent of creasing of each web increasing in direct proportion to the distance of the web in the final tube from the innermost ply of the tube.

3. The method as defined in claim 2, wherein the innermost ply of the final tube is a non-fibrous, fluid-impervious liner additional to the plurality of individual fibrous webs.

4. In a method of making a multi-ply laminated tube of non-circular cross section including the steps of assembling a plurality of individual fibrous webs into a composite multi-thickness sheet, transversely severing the sheet and wrapping the same about a transverse axis into a polygonal tubular configuration, the improvements of transversely creasing the individual fibrous webs to different extents prior to their adhesive assembly and at locations corresponding to the juncture of adjacent tube sides to accumulate additional material in the webs when laminated to accommodate subsequent wrapping of the multi-thickness sheet about said axis, the extent of creasing of each web increasing in direct proportion to the distance of the web in the final tube from the outermost ply of the tube.

5. The method as defined in claim 4, wherein the innermost ply of the final tube is a non-fibrous, fluid-impervious liner additional to the plurality of individual fibrous webs.

6. In a method of making a multi-ply laminated tube of substantially circular cross-section including the steps of assembling a plurality of individual fibrous webs into a composite multi-thickness sheet, transversely severing the sheet and wrapping the same about a transverse axis into a tubular configuration, the improvements of transversely creasing the individual fibrous webs to different extents and at a plurality of substantially equidistant locations prior to their adhesive assembly to accumulate additional material in the webs when laminated to accommodate subsequent wrapping of the multi-thickness sheet about said axis, said creases each extending parallel to the axis about which the sheet is wrapped and the extent of creasing in each web increasing in direct proportion to the distance of the web in the final tube from the innermost ply of the tube.

7. The method as defined in claim 6, wherein the innermost ply of the final tube is a non-fibrous fluid-impervious liner additional to the plurality of individual fibrous webs.

8. In a method of making a multi-ply laminated tube of substantially circular cross-section including the steps of assembling a plurality of individual fibrous webs into a composite multi-thickness sheet, transversely severing the sheet and wrapping the same about a transverse axis into a tubular configuration, the improvements of transversely creasing the individual fibrous webs to different extents and at a plurality of substantially equidistant locations prior to their adhesive assembly to accumulate additional material in the webs when laminated to accommodate subsequent wrapping of the multi-thickness sheet about said axis, said creases each extending parallel to the axis about which the sheet is wrapped and the extent of creasing in each web increasing in direct proportion to the distance of the web in the final tube from the outermost ply of the tube.

9. The method as defined in claim 8, wherein the innermost ply of the final tube is a non-fibrous fluid-impervious liner additional to the plurality of individual fibrous webs.

References Cited in the file of this patent

UNITED STATES PATENTS

| | | |
|---|---|---|
| 1,062,002 | Harbeck | May 20, 1913 |
| 2,256,263 | Haycock | Sept. 16, 1941 |